US012094678B2

(12) United States Patent
Fujihara et al.

(10) Patent No.: US 12,094,678 B2
(45) Date of Patent: Sep. 17, 2024

(54) TRIGGER SWITCH

(71) Applicant: OMRON Corporation, Kyoto (JP)

(72) Inventors: Takumi Fujihara, Okayama (JP); Keiichiro Kobuchi, Okayama (JP); Taiki Koyama, Okayama (JP); Kazushi Maeta, Okayama (JP); Kohei Sugiyama, Okayama (JP)

(73) Assignee: OMRON Corporation, Kyoto (JP)

(*) Notice: Subject to any disclaimer, the term of this patent is extended or adjusted under 35 U.S.C. 154(b) by 8 days.

(21) Appl. No.: 17/262,236

(22) PCT Filed: Mar. 13, 2019

(86) PCT No.: PCT/JP2019/010408
§ 371 (c)(1),
(2) Date: Jan. 22, 2021

(87) PCT Pub. No.: WO2020/039628
PCT Pub. Date: Feb. 27, 2020

(65) Prior Publication Data

US 2021/0304975 A1 Sep. 30, 2021

(30) Foreign Application Priority Data

Aug. 24, 2018 (JP) ................................ 2018-156881

(51) Int. Cl.
*H01H 9/06* (2006.01)
*B25F 5/00* (2006.01)
(Continued)

(52) U.S. Cl.
CPC ............... *H01H 9/06* (2013.01); *B25F 5/001* (2013.01); *H01H 13/08* (2013.01); *H01H 13/64* (2013.01)

(58) Field of Classification Search
CPC ...... H01H 3/125; H01H 13/705; H01H 13/14; H01H 13/04; H01H 13/10; H01H 13/70;
(Continued)

(56) References Cited

U.S. PATENT DOCUMENTS 3,309,484 A * 3/1967 Frenzel .................. H01H 13/08 200/324
3,781,579 A * 12/1973 Rosenthal, Jr. ........ H01H 13/08 200/318.1

(Continued)

FOREIGN PATENT DOCUMENTS

CN 101789319 A 7/2010
EP 0048124 A2 3/1982

(Continued)

OTHER PUBLICATIONS

English translation of the International Search Report ("ISR") of PCT/JP2019/010408 mailed on Jun. 4, 2019.

(Continued)

*Primary Examiner* — Ahmed M Saeed
(74) *Attorney, Agent, or Firm* — METROLEX IP LAW GROUP, PLLC; Robert L. Scott, Esq.

(57) ABSTRACT

A trigger switch used in electric devices such as various types of electric tools may be provided that drives a drive unit, such as a drive motor of the electric device, by pushing a trigger. A trigger switch includes a mode switching lever that switches between a constant speed mode in which the drive unit is driven at constant speed and a shift mode in which the drive unit is driven by an output corresponding to a pushing amount of a trigger. Further, the mode switching lever includes a regulating portion that regulates the pushing amount of the trigger according to the switched mode.

8 Claims, 21 Drawing Sheets

(51) Int. Cl.
*H01H 13/08* (2006.01)
*H01H 13/64* (2006.01)

(58) Field of Classification Search
CPC ............. H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20; H01H 9/06; H01H 13/08; H01H 13/64; B25F 5/001; B25F 5/00
See application file for complete search history.

(56) References Cited

U.S. PATENT DOCUMENTS

| | | | | |
|---|---|---|---|---|
| 6,262,380 | B1 | 7/2001 | Sasaki et al. | |
| 6,710,273 | B1 * | 3/2004 | Skarlupka | H01H 23/065 200/339 |
| 2010/0187085 | A1 | 7/2010 | Inagaki et al. | |
| 2012/0169256 | A1 * | 7/2012 | Suda | B25D 16/003 318/17 |
| 2016/0342151 | A1 | 11/2016 | Dey, IV et al. | |
| 2016/0351355 | A1 | 12/2016 | Hozumi | |
| 2019/0381648 | A1 * | 12/2019 | Wadeson | B25B 21/002 |

FOREIGN PATENT DOCUMENTS

| | | | |
|---|---|---|---|
| GB | 1212163 | A | 11/1970 |
| JP | S57-82874 | U | 5/1982 |
| JP | H1-291686 | A | 11/1989 |
| JP | H10-69838 | A | 3/1998 |
| JP | 2001-322074 | A | 11/2001 |
| JP | 2005-169534 | A | 6/2005 |
| JP | 2006-231494 | A | 9/2006 |
| JP | 2011-51079 | A | 3/2011 |
| JP | 2016-225147 | A | 12/2016 |

OTHER PUBLICATIONS

Written Opinion(“WO”) of PCT/JP2019/010408 mailed on Jun. 4, 2019.
Office Action (JPOA) issued on Mar. 22, 2022 in a counterpart Japanese patent application.
Office Action (CNOA) issued on Jun. 28, 2024 in a counterpart Chinese patent application No. 201980046109.

* cited by examiner

TRIGGER SWITCH

TECHNICAL FIELD

The present invention relates to a trigger switch that drives a drive unit by pushing a trigger.

BACKGROUND ART

As a kind of trigger switch for controlling operation of an electric tool, for example, Patent Document 1 discloses a trigger switch capable of changing rotation speed of a motor. In the trigger switch disclosed in Patent Document 1, when a trigger is pressed, a power supply to the motor is turned on, and when the trigger is further pressed, supply voltage to the motor rises and the rotation speed of the motor rises. In addition, a speed adjusting dial for adjusting an upper limit of the rotation speed of the motor is incorporated in the trigger.

PRIOR ART DOCUMENTS

Patent Documents

Patent Document 1: Japanese Unexamined Patent Publication No. 2006-231494

SUMMARY OF THE INVENTION

Problems to be Solved by the Invention

However, while a trigger switch that increases rotation speed of a motor by trigger operation as disclosed in Patent Document 1 is required, there is also a case where a trigger switch in which rotation speed of a motor is held at constant speed is required.

The present invention has been made in view of such circumstances, and a purpose thereof is to provide a trigger switch that can be switched between a mode in which a drive unit is driven at constant speed and a mode in which the drive unit is driven by an output according to a pushing amount of a trigger by switching a switching member.

Means for Solving the Problem

In order to solve the above problem, a trigger switch described in the present application is a trigger switch configured to drive a drive unit by pushing a trigger, including: a switching member configured to switch between a mode in which the drive unit is driven at constant speed and a mode in which the drive unit is driven by an output according to a pushing amount of the trigger.

Further, in the trigger switch, the switching member includes a regulating portion configured to regulate the pushing amount of the trigger according to the switched mode.

Further, the trigger switch includes an engaging member configured to engage with the switching member. The switching member is swingable, is formed to determine a mode based on a swing position, and includes an engaging portion configured to engage with the engaging member according to the swing position that determines the mode. One of the engaging member and the engaging portion of the switching member is a projection, and another thereof is a recess.

Further, in the trigger switch, the switching member includes a lever configured to receive swing operation.

Further, the trigger switch includes a casing to which the trigger is attached. The switching member is attached to the casing at a position different from that of the trigger, and a sealing member is attached to an attachment portion of the switching member in the casing.

The trigger switch described in the present application may be switched, by the switching member, between the mode in which the drive unit is driven at the constant speed and the mode in which the drive unit is driven by the output according to the pushing amount of the trigger.

Effect of the Invention

The trigger switch according to one or more embodiments includes the switching member configured to switch between the mode in which the drive unit is driven at the constant speed and the mode in which the drive unit is driven by the output according to the pushing amount of the trigger. As a result, the mode for driving the drive unit may be switched according to a user's purpose of use, so that the trigger switch has excellent effects such as improvement in convenience.

MODE FOR CARRYING OUT THE INVENTION

Hereinafter, embodiments of the present invention will be described with reference to the drawings.

Application Examples

A trigger switch described in the present application is applied to various electric devices including electric tools such as electric screwdrivers, electric wrenches, and electric grinders. In the embodiments illustrated below, such a trigger switch will be described with reference to the drawings.

Embodiments

Figure 1:
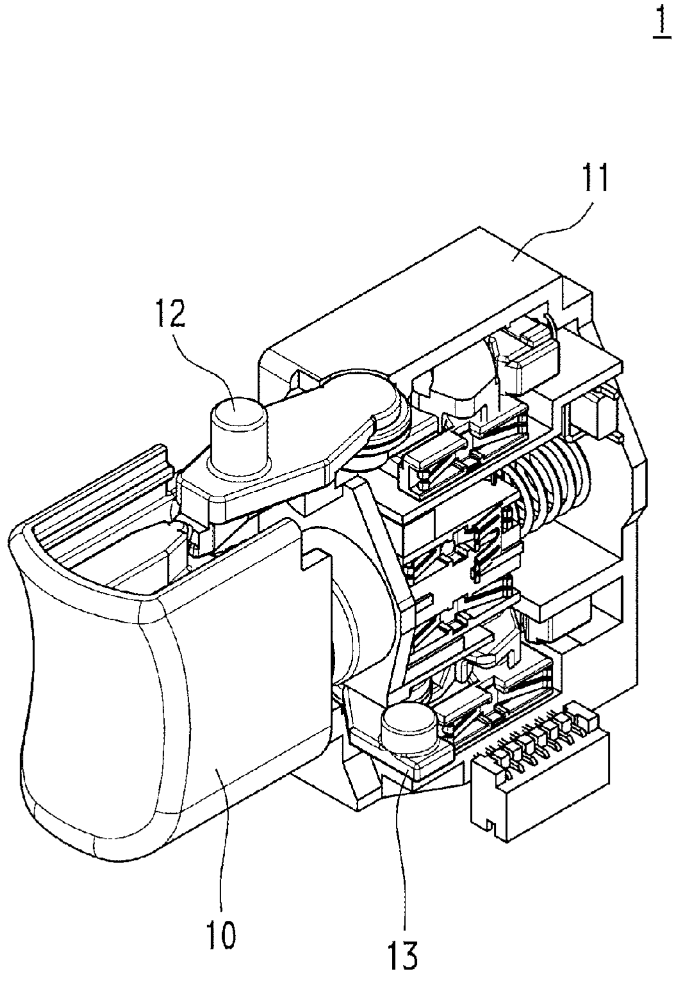
FIG. 1 is a diagram illustrating a schematic perspective view of an example of a trigger switch described in the present application in a partially broken state.

FIG. 1 is a schematic perspective view showing an example of a trigger switch 1 described in the present application in a partially broken state. FIG. 1 shows appearance of the trigger switch 1 that can be incorporated into various electric devices (not shown) such as electric tools in the partially broken state so that an internal structure can be visually recognized as viewed from the diagonally upper front. The trigger switch 1 is a switch operated by a user of the electric device. The user performs pushing operation of pushing a trigger 10 of the trigger switch 1 to drive a drive unit (not shown) such as an electric motor built in the electric device. The trigger switch 1 includes a casing 11 incorporated in the electric device and the trigger 10 that can be pushed by an operator. Further, the trigger switch 1 includes a forward/reverse switching lever 12 for switching a drive direction of the drive unit, for example, a forward/reverse direction of a rotation direction of an electric screwdriver, and a mode switching lever (switching member) 13 for switching a drive mode of the drive unit. Note that, in the following description, directions of the trigger switch 1 are expressed as follows: the side to which the trigger 10 is attached as "front"; the casing 11 side as "rear"; the forward/reverse switching lever 12 side as "up"; and the mode switching lever 13 side as "down". However, these are directions for convenience of explanation, and do not limit the direction when the trigger switch 1 is used.

The drive mode in the trigger switch 1 described in the present application will be described. As the drive mode, the trigger switch 1 implements a constant speed mode in which the drive unit is driven at constant speed and a shift mode in which the drive unit is driven by an output corresponding to a pushing amount of the trigger 10. Note that the trigger switch 1 illustrated in the present application illustrates a mode in which the shift mode is further switched to a full speed mode in which the drive unit is driven at the maximum speed.

Figure 2:
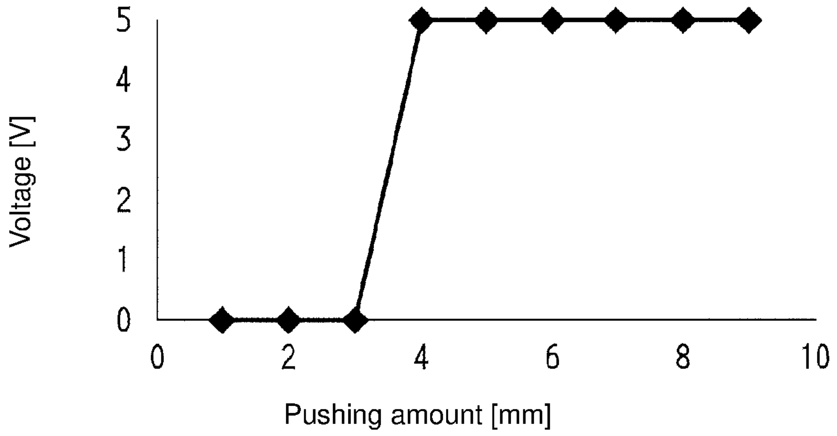
FIG. 2 is a diagram illustrating a graph of control of a drive unit included in an electric device incorporating a trigger switch described in the present application.
Figure 3:
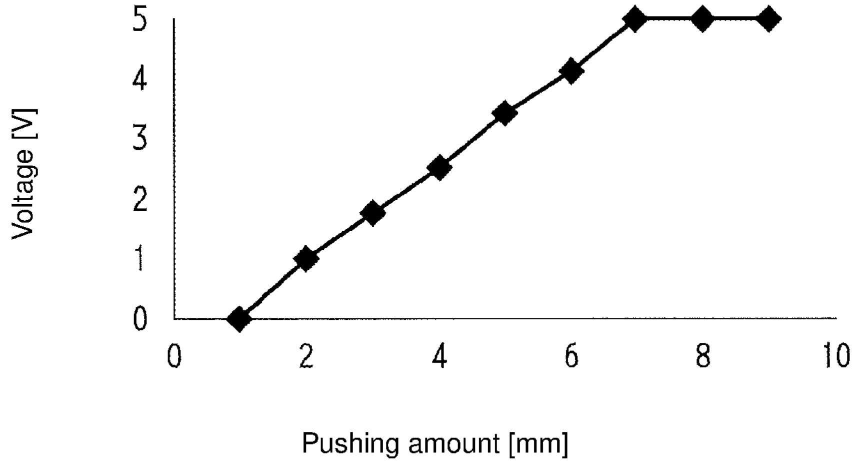
FIG. 3 is a diagram illustrating a graph of control of the drive unit included in an electric device incorporating a trigger switch described in the present application.

FIGS. 2 and 3 are graphs showing control of the drive unit included in the electric device incorporating the trigger switch 1 described in the present application. FIGS. 2 and 3 are S-V characteristic graphs showing a relationship between a pushing amount (stroke: mm) of the trigger 10 on a horizontal axis and voltage (V) output to the drive unit on a vertical axis for each pushing amount of 0.5 mm. FIG. 2 shows S-V characteristics in the constant speed mode, and FIG. 3 shows S-V characteristics in the shift mode.

In the constant speed mode showing the S-V characteristics in FIG. 2, the output is turned on when the pushing amount is 4 mm, and constant speed, here the maximum output voltage of 5 V, is output to the drive unit. Note that an embodiment of the trigger switch 1 that regulates the pushing amount so as not to be 4 mm or more in the constant speed mode will be described here as an example, but it may be designed so that it can be pushed to 4 mm or more. Further, the output voltage in the constant speed mode can be appropriately designed.

In the shift mode showing the S-V characteristics in FIG. 3, the output is turned on when pushing is started, and the output increases according to the pushing amount. When the pushing amount exceeds 7 mm, the maximum output voltage of 5V is output to the drive unit, and the shift mode becomes a full speed mode. Note that, an embodiment of the trigger switch 1 that regulates the maximum pushing amount to be 8.6 mm in the shift mode will be described here as an example, but various specifications such as the maximum pushing amount and the S-V characteristics can be designed as appropriate.

Figure 4:
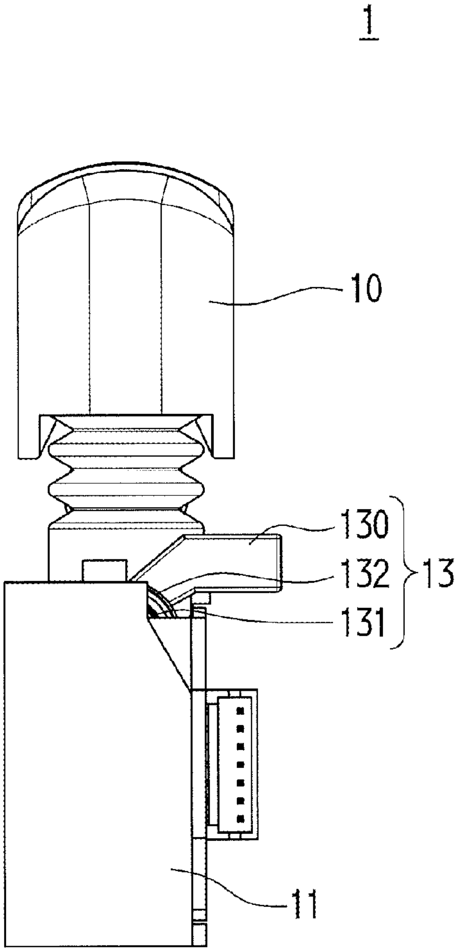
FIG. 4 is a diagram illustrating a schematic bottom view of an example of an appearance of a trigger switch described in the present application.
Figure 5:
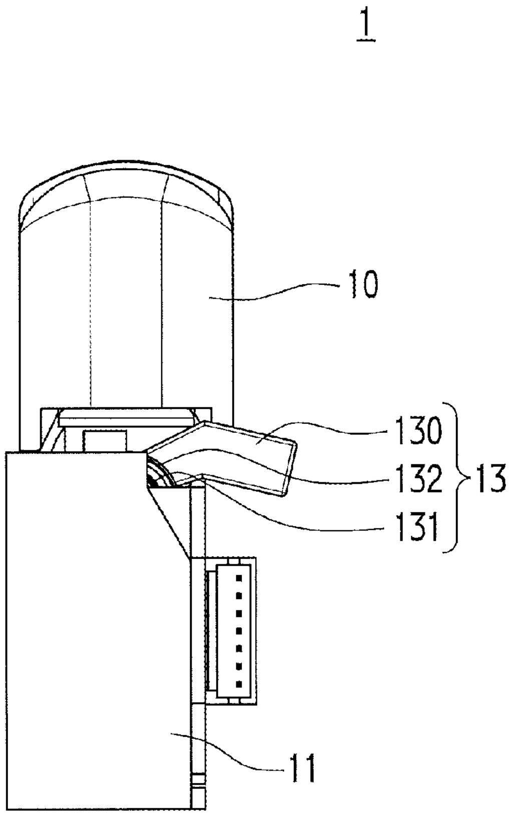
FIG. 5 is a diagram illustrating a schematic bottom view of an example of an appearance of a trigger switch described in the present application.

FIGS. 4 and 5 are schematic bottom views showing an example of appearance of the trigger switch 1 described in the present application. FIG. 4 shows the trigger switch 1 switched to the constant speed mode, and FIG. 5 shows the trigger switch 1 switched to the shift mode. The mode switching lever 13 includes a lever 130 that receives user's swing operation and a swing shaft 131 that serves as a swing shaft, and is attached to the casing 11 by the swing shaft 131. The mode switching lever 13 is attached to the casing 11 at a position different from that of the trigger 10. A sealing member 132 such as a rubber packing is attached to the swing shaft 131 that serves as an attachment portion to the casing 11.

The user can switch between the constant speed mode and the shift mode by operating the lever 130 and swinging the mode switching lever 13 around the swing shaft 131. By swinging the mode switching lever 13, the drive mode of the drive unit is switched. Therefore, as illustrated in FIGS. 4 and 5, the user can recognize the drive mode by confirming the position of the mode switching lever 13. Further, since the mode switching lever 13 is attached to the casing 11 separately from the trigger 10 and the sealing member 132 is attached to the swing shaft 131, a water-resistant property is maintained. Note that a sealing member such as packing is also attached to the forward/reverse switching lever 12 located above.

Figure 6:
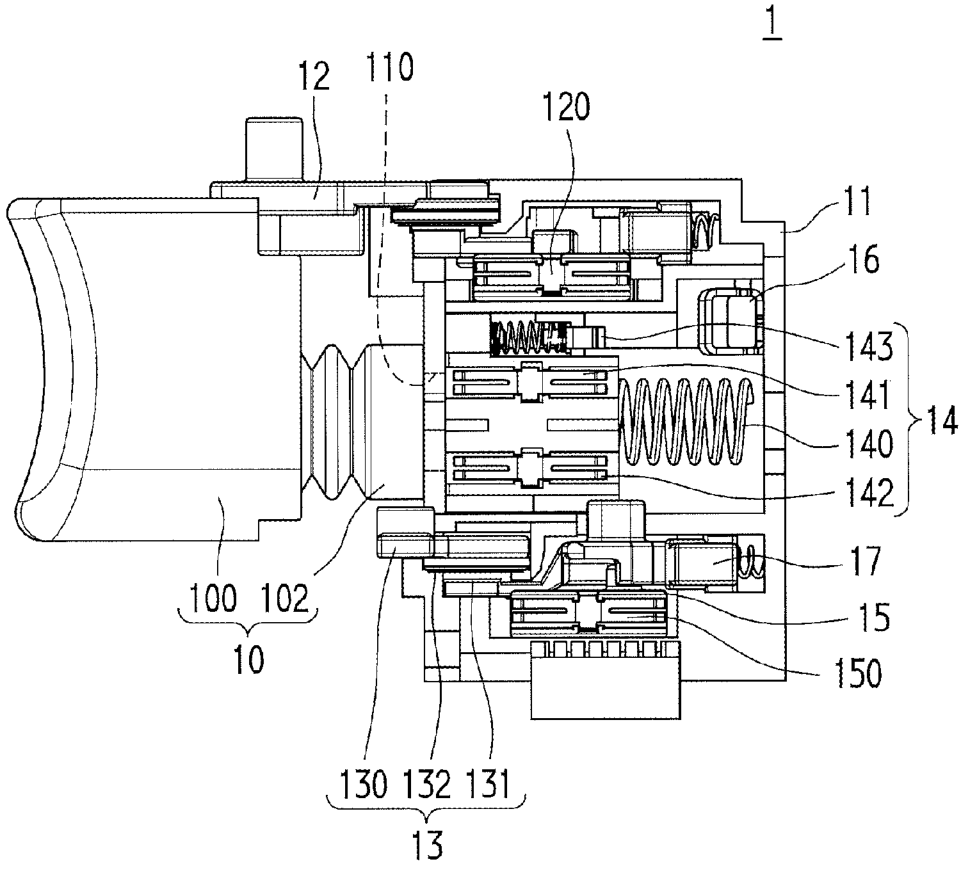
FIG. 6 is a diagram illustrating a schematic view of an example of an internal configuration of a trigger switch described in the present application.
Figure 7:
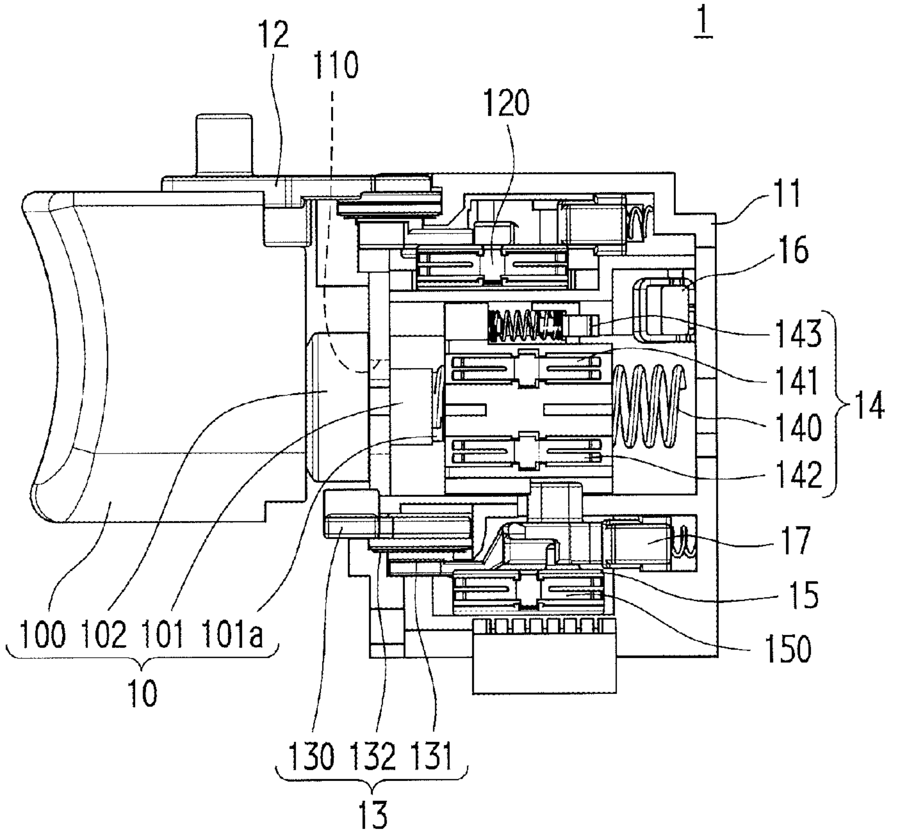
FIG. 7 is a diagram illustrating a schematic view of an example of an internal configuration of a trigger switch described in the present application.
Figure 8:
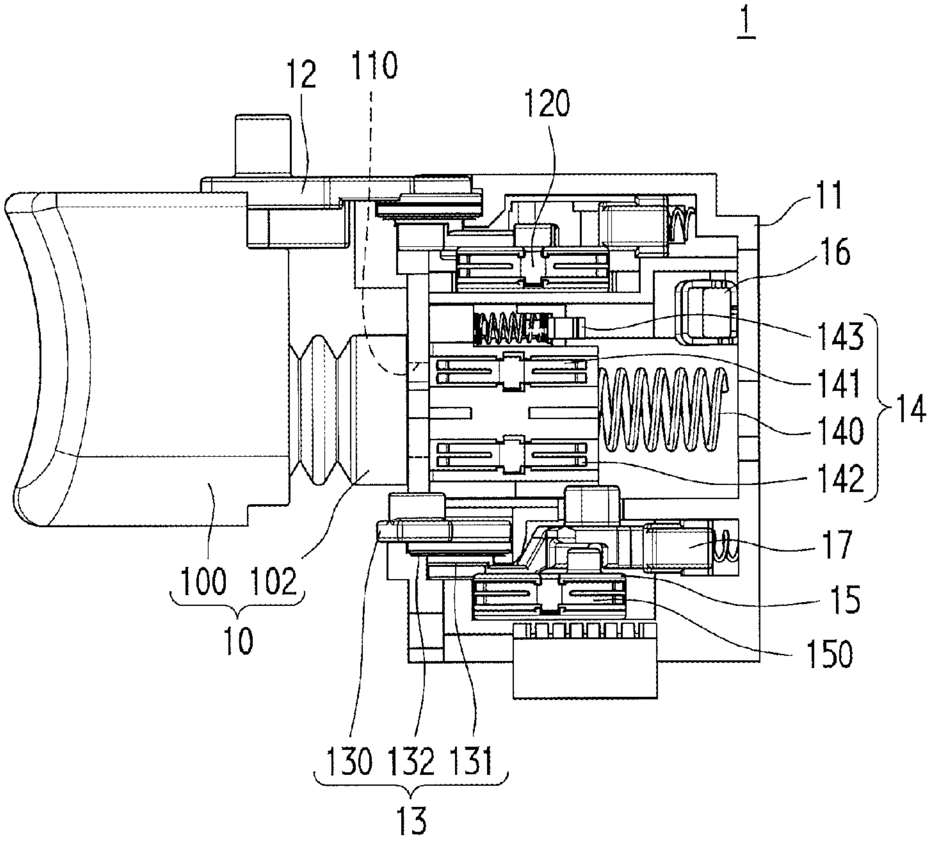
FIG. 8 is a diagram illustrating a schematic view of an example of an internal configuration of a trigger switch described in the present application.
Figure 9:
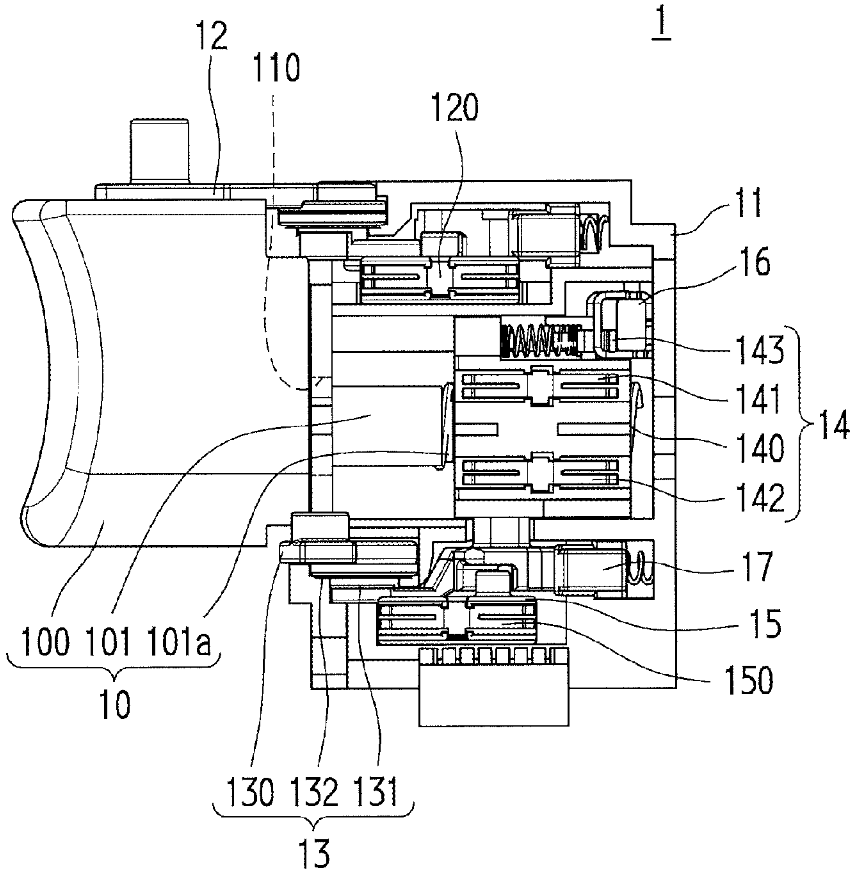
FIG. 9 is a diagram illustrating a schematic view of an example of an internal configuration of a trigger switch described in the present application.

Next, an internal configuration of the trigger switch 1 will be described. FIGS. 6 to 9 are schematic views showing an example of the internal configuration of the trigger switch 1 described in the present application. FIGS. 6 to 9 show the trigger switch 1 as viewed from the right side, and show it through the casing 11 so that inside of the casing 11 can be visually recognized. FIGS. 6 and 7 are cases where the mode switching lever 13 is at a position in the constant speed mode. FIG. 6 shows a state in which the trigger 10 is released, and FIG. 7 shows a state in which the trigger 10 pushed. FIGS. 8 and 9 are cases where the mode switching lever 13 is at a position in the shift mode. FIG. 8 shows a state in which the trigger 10 is released, and FIG. 9 shows a state in which the trigger 10 pushed.

As illustrated in FIGS. 6 to 9, besides the forward/reverse switching lever 12 and the mode switching lever 13 mentioned above, the trigger switch 1 houses various members such as a plunger 14, a brush stand 15, a full speed fixed contact 16, and an engaging member 17 inside the casing 11.

The trigger 10 includes an operation unit 100 that the user touches during operation and a through shaft 101 extending from the operation unit 100 to the casing 11 side. The through shaft 101 is disposed to pass through a through hole 110 (indicated by broken lines in the drawing) formed on a front surface of the casing 11. Further, between the operation unit 100 and the casing 11, a spring member such as a compression coil spring that urges the operation unit 100 forward is disposed so as to wind the through shaft 101 in a circumferential direction. Note that, since the spring member is covered with a rubber cover 102 formed in a bellows shape, it cannot be visually recognized from the outside.

The plunger 14 that operates in conjunction with the trigger 10 is movably disposed inside the casing 11. A pusher 101*a* provided at a leading end of the through shaft 101 of the trigger 10 abuts on a front surface of the plunger 14. An urging member 140 such as a compression coil spring that urges the plunger 14 forward is disposed on a rear side of the plunger 14. When the trigger 10 is pushed, the pusher 101*a* provided at the leading end of the through shaft 101 of the trigger 10 pushes the plunger 14 backward against urging force of the urging member 140. When the trigger 10 is released, the plunger 14 moves forward by the urging force of the urging member 140.

Inside the casing 11, there are provided with: a first brush 120 which moves back and forth in conjunction with a swing of the forward/reverse switching lever 12; a second brush 141 and a third brush 142 which are attached parallel to the plunger 14 and move back and forth together with the plunger 14; and a fourth brush 150 attached to the brush stand 15 that moves back and forth in conjunction with the swing of the mode switching lever 13. The first brush 120, the second brush 141, the third brush 142, and the fourth brush 150 are disposed in this order from an upper part to a lower part inside the casing 11. The first brush 120, the second brush 141, the third brush 142, and the fourth brush 150 each have two brush pieces extending forward from a central support and two brush pieces extending backward therefrom. The vicinity of a leading end of each brush piece is a movable contact that abuts on a fixed contact (each electrode illustrated in FIGS. 16 to 19) disposed inside the casing 11.

The first brush 120 has a function of switching the drive direction of the drive unit in conjunction with the swing of the forward/reverse switching lever 12. The second brush 141 has a function of adjusting an output in the shift mode and the like. The third brush 142 has an on/off switching function of the drive unit. The fourth brush 150 has a drive mode switching function.

In addition, a full speed movable contact 143 that opens and closes a circuit that drives the drive unit with the maximum output is disposed on an upper part of the plunger 14, and a compression coil spring that serves as a buffer is attached in front of the full speed movable contact 143. When the plunger 14 is pushed by the trigger 10 to a predetermined pushing amount or more, the full speed movable contact 143 abuts on the full speed fixed contact 16 disposed in the casing 11 and closes the circuit having the maximum output. Note that, if the plunger 14 is further pushed after the full speed movable contact 143 abuts on the full speed fixed contact 16, the compression coil spring is compressed while maintaining the abutting state.

Figure 10A:
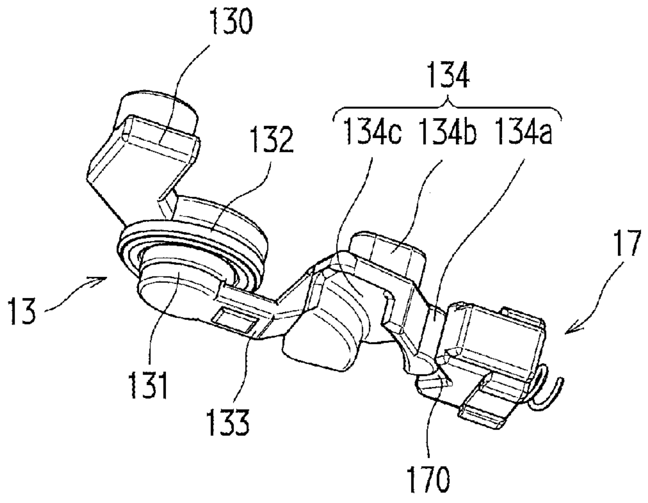
FIG. 10A is a diagram illustrating a schematic external view of an example of an appearance of a mode switching lever included in a trigger switch described in the present application.
Figure 10B:
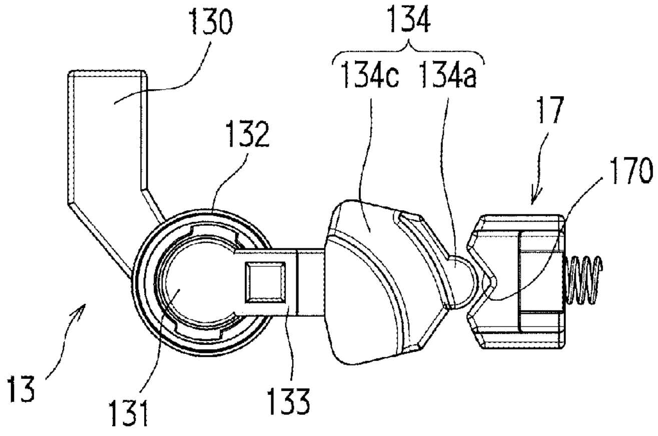
FIG. 10B is a diagram illustrating a schematic external view of an example of an appearance of a mode switching lever included in a trigger switch described in the present application.

Next, shapes, operation, and cooperation of various members included in the trigger switch 1 will be described. FIGS. 10A and 10B are schematic external views showing an example of appearance of the mode switching lever 13 included in the trigger switch 1 described in the present application. FIGS. 10A and 10B show the mode switching lever 13 together with the engaging member 17 that engages the mode switching lever 13. FIG. 10A shows them as viewed from the diagonally lower front, and FIG. 10B shows them as viewed from below.

The mode switching lever 13 includes the lever 130, the swing shaft 131, and the sealing member 132 described above, and further includes an extension portion 133 and a working portion 134 extending substantially rearward from the swing shaft 131. The extension portion 133 and the working portion 134 of the mode switching lever 13 attached to the casing 11 by the swing shaft 131 are housed in the casing 11. The extension portion 133 extends rearward from the swing shaft 131, and the wide and thick working portion 134 is formed at a leading end of the extension portion 133.

The working portion 134 has a rounded pentagonal shape when viewed from above, and a semicircular engaging portion 134*a* that engages with the engaging member 17 is projected from an apex located at a leading end portion. A regulating portion 134*b* that engages with the plunger 14 and regulates the pushing amount of the trigger 10 is projected on an upper surface of the working portion 134. An arc-shaped cam groove 134*c* is engraved on a lower surface of the working portion 134.

The engaging member 17 is disposed behind the mode switching lever 13 in the casing 11. A front surface of the engaging member 17 facing the mode switching lever 13 is formed in an M shape when viewed from above, and the vicinity of the center is a recess 170. Further, the engaging member 17 is urged toward the mode switching lever 13 in front by a compression coil spring attached to the rear.

Figure 11A:
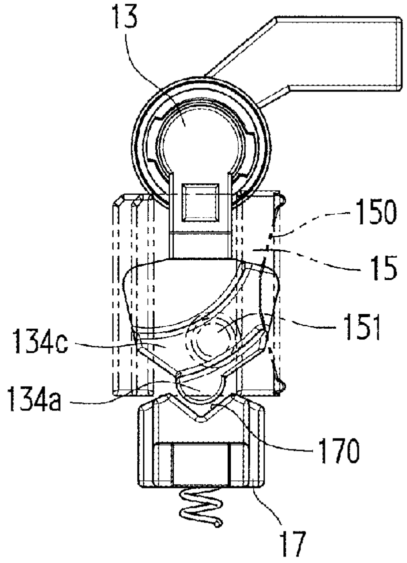
FIG. 11A is a diagram illustrating a schematic external view of an example of a mode switching lever, an engaging member, and a brush stand included in a trigger switch described in the present application.
Figure 11B:
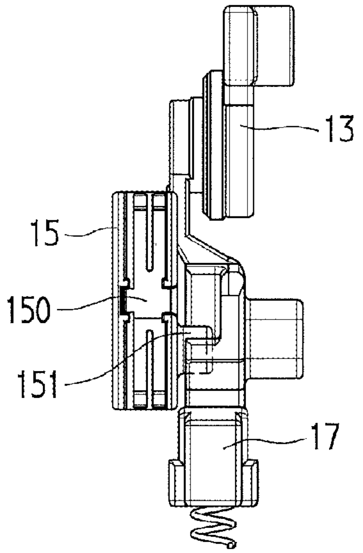
FIG. 11B is a diagram illustrating a schematic external view of an example of a mode switching lever, a engaging member, and a brush stand included in a trigger switch described in the present application.
Figure 12A:
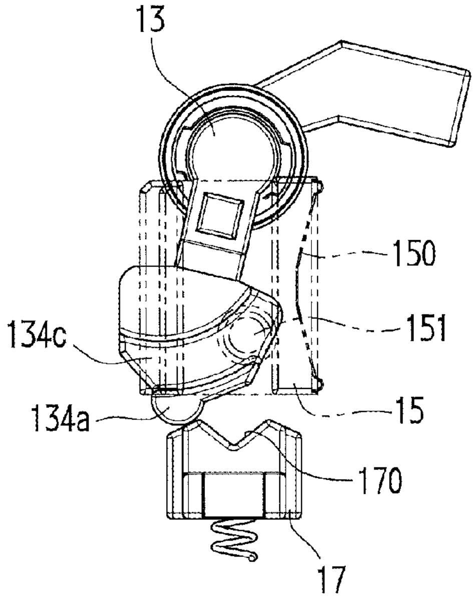
FIG. 12A is a diagram illustrating a schematic external view of an example of a mode switching lever, a engaging member, and a brush stand included in a trigger switch described in the present application.
Figure 12B:
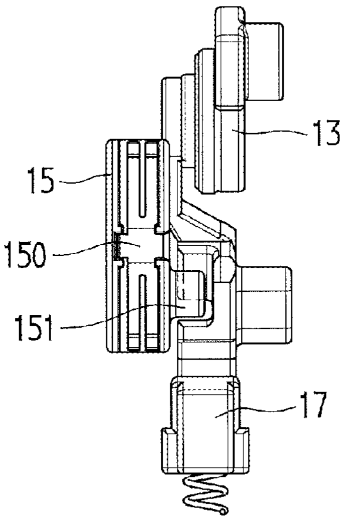
FIG. 12B is a diagram illustrating a schematic external view of an example of a mode switching lever, a engaging member, and a brush stand included in a trigger switch described in the present application.

Interlocking operation of the mode switching lever 13, the brush stand 15, and the engaging member 17 will be described. FIGS. 11A, 11B, 12A, and 12B are schematic external views showing an example of the mode switching lever 13, the engaging member 17, and the brush stand 15 included in the trigger switch 1 described in the present application. FIGS. 11A and 11B show a state of switching to the constant speed mode, and FIGS. 12A and 12B show a state of switching to the shift mode. FIGS. 11A and 12A show the units as viewed from below, and an outer shape of the brush stand 15 is shown by a chain double-dashed line. FIGS. 11B and 12B show them as viewed from the right side.

The brush stand 15 has a substantially rectangular parallelepiped shape, and the fourth brush 150 is attached to a right side surface. A cylindrical projection 151 is projected on an upper surface side of the brush stand 15, and the projection 151 fits into the cam groove 134*c* engraved on a lower surface of the mode switching lever 13.

In a case of the constant speed mode shown in FIGS. 11A and 11B, the engaging portion 134*a* formed on the mode switching lever 13 as a projection is fitted and engaged with the recess 170 of the engaging member 17. Since the engaging member 17 is urged toward the mode switching lever 13, the position of the mode switching lever 13 is fixed by engaging with the engaging member 17. In a case of the shift mode shown in FIGS. 12A and 12B, the engaging portion 134*a* of the mode switching lever 13 swung from the position in the constant speed mode moves to a right side (left side when facing FIG. 12A) of the recess 170 of the engaging member 17. Since the engaging member 17 is urged toward the mode switching lever 13, the position of the mode switching lever 13 does not return to the position in the constant speed mode. Further, when a user switches a drive mode, he/she operates the mode switching lever 13 so that the engaging portion 134*a* of the mode switching lever 13 crosses a side mountain of the recess 170 against the bias. Accordingly, since the user feels a click feeling by touch, he/she can recognize the mode switching.

The brush stand 15 is disposed so as to be movable in the casing 11, and is restricted in the casing 11 so that a moving direction is limited to a front-rear direction. The projection 151 of the brush stand 15 is fitted in the cam groove 134*c* of the mode switching lever 13. Therefore, when the mode switching lever 13 is operated from the constant speed mode shown in FIGS. 11A and 11B to the shift mode shown in FIGS. 12A and 12B, the projection 151 is pushed on an inner surface of the swinging cam groove 134*c*, and the brush stand 15 moves forward (upward when facing the drawing). Further, when the mode switching lever 13 is operated from the shift mode to the constant speed mode, the projection 151 is pushed on the inner surface of the swinging cam groove 134*c*, and the brush stand 15 moves rearward (downward when facing the drawing). Therefore, when the constant speed mode is switched to the shift mode, the fourth brush 150 moves forward, and when the shift mode is switched to the constant speed mode, the fourth brush 150 moves rearward.

As described above, the mode switching lever 13, the brush stand 15, and the engaging member 17 interlock, and the fourth brush 150 moves according to the operation of the mode switching lever 13. Thereby, the drive mode is switched. In other words, the mode switching lever 13 is formed so as to determine the drive mode based on a swing position, and the mode switching lever 13 engages with the engaging member 17 according to the swing position that determines the drive mode.

Figure 13:
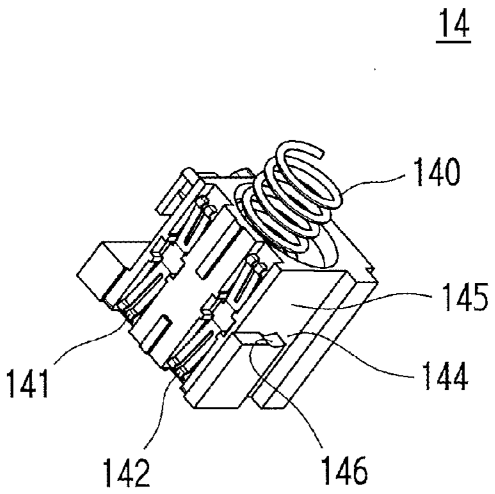
FIG. 13 is a diagram illustrating a schematic external view of an example of appearance of a plunger included in a trigger switch described in the present application.

FIG. 13 is a schematic external view showing an example of appearance of the plunger 14 included in the trigger switch 1 described in the present application. FIG. 13 shows the plunger 14 as viewed from the diagonally lower rear. The plunger 14 has a substantially rectangular parallelepiped shape, and the second brush 141 and the third brush 142 are attached to a right side surface (left front side when facing the drawing). Further, the urging member 140 for urging the plunger 14 forward is disposed on a rear surface (upper right side when facing the drawing). Furthermore, on a lower surface (lower right side when facing the drawing), a through groove 144 is engraved linearly in the front-rear direction. A recessed plane 145 whose front portion has the same depth as the through groove 144 is formed on a right side of the through groove 144 engraved on the lower surface of the plunger 14. A receiving portion 146 recessed rearward in an arc shape is formed on a wall surface located at a front end of the recessed plane 145.

Figure 14:
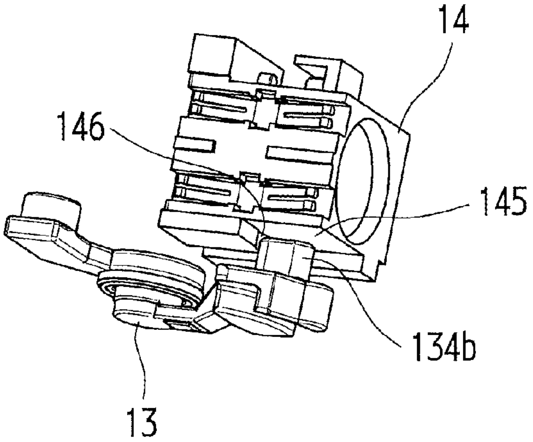
FIG. 14 is a diagram illustrating a schematic external view of an example of a mode switching lever and a plunger included in a trigger switch described in the present application.
Figure 15:
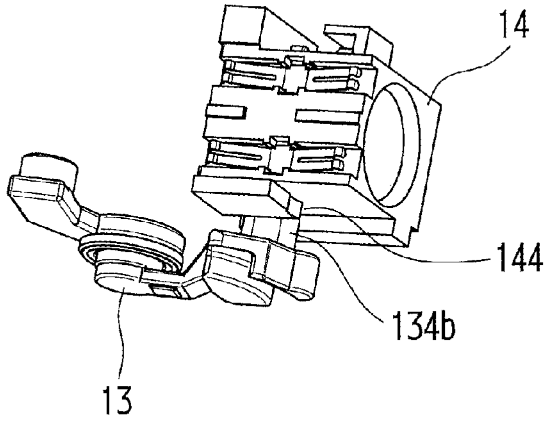
FIG. 15 is a diagram illustrating a schematic external view of an example of a mode switching lever and a plunger included in a trigger switch described in the present application.

FIGS. 14 and 15 are schematic external views showing an example of the mode switching lever 13 and the plunger 14 included in the trigger switch 1 described in the present application. FIG. 14 shows a state in which the trigger 10 is pushed in the constant speed mode, and FIG. 15 shows a state in which the trigger 10 is pushed in the shift mode. FIGS. 14 and 15 show the mode switching lever 13 and the plunger 14 as viewed from the diagonally lower rear.

As illustrated in FIG. 14, in a case of the constant speed mode, the regulating portion 134*b* projected on the upper surface of the working portion 134 of the mode switching lever 13 is located on a right side of the lower surface of the plunger 14. Then, the trigger 10 is pushed, and the plunger 14 moves backward (the right side when facing the drawing). The receiving portion 146 abuts on the regulating portion 134*b* of the mode switching lever 13, and downward movement of the plunger 14 is regulated at the abutting position. Therefore, the pushing amount of the trigger 10 in the constant speed mode is limited to 4 mm.

As illustrated in FIG. 15, in a case of the shift mode, the regulating portion 134*b* of the mode switching lever 13 is located on a left side of the lower surface of the plunger 14. Then, the plunger 14 moves backward by being pushed by the trigger 10. However, since the regulating portion 134*b* of the mode switching lever 13 passes through the through groove 144, the movement of the plunger 14 is not regulated. Therefore, the trigger 10 can be pushed up to 8.6 mm in the shift mode.

Figure 16:
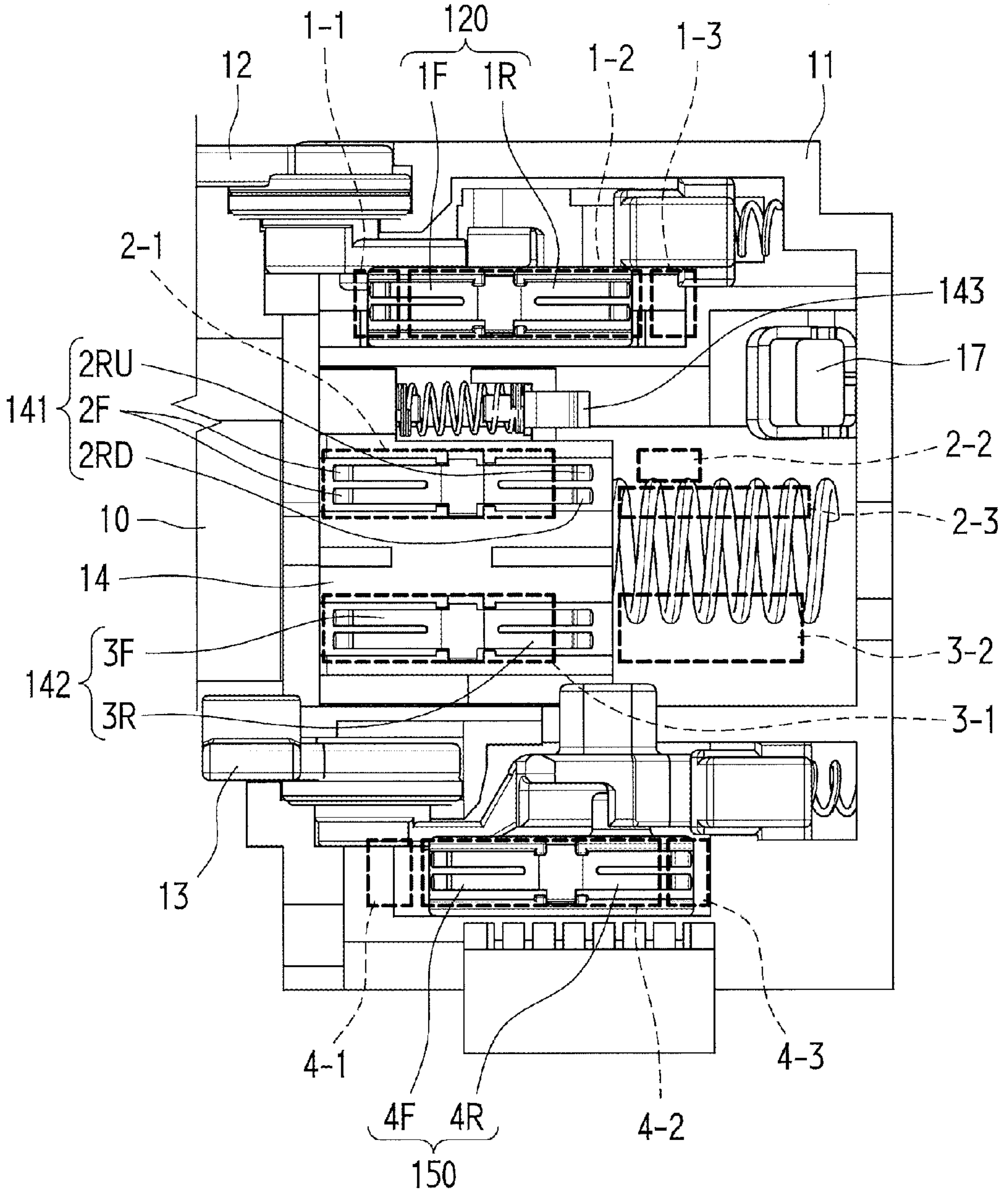
FIG. 16 is a diagram illustrating a schematic view of an example of an internal configuration of a casing included in a trigger switch described in the present application.
Figure 17:
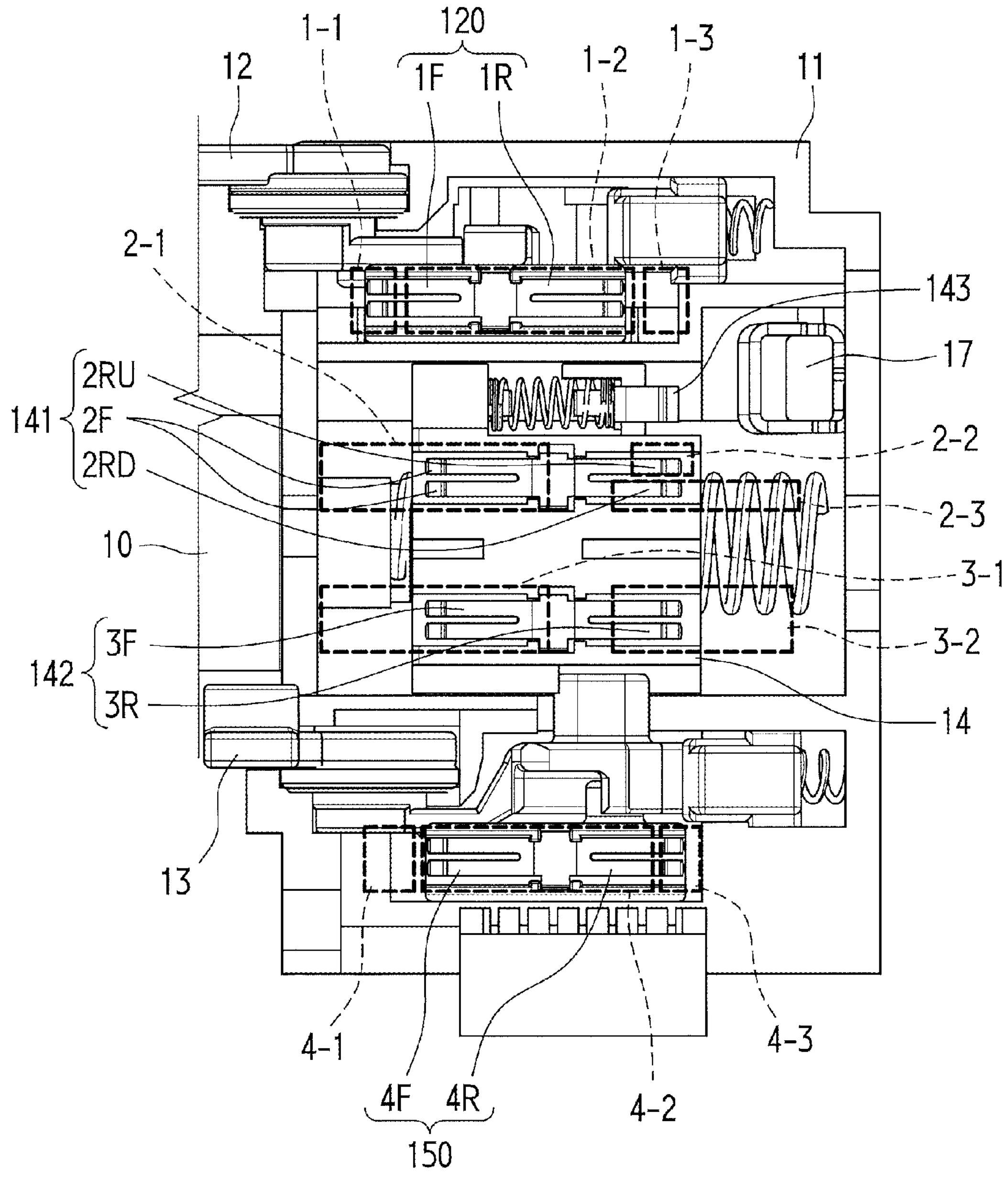
FIG. 17 is a diagram illustrating a schematic view of an example of the internal configuration of a casing included in a trigger switch described in the present application.
Figure 18:
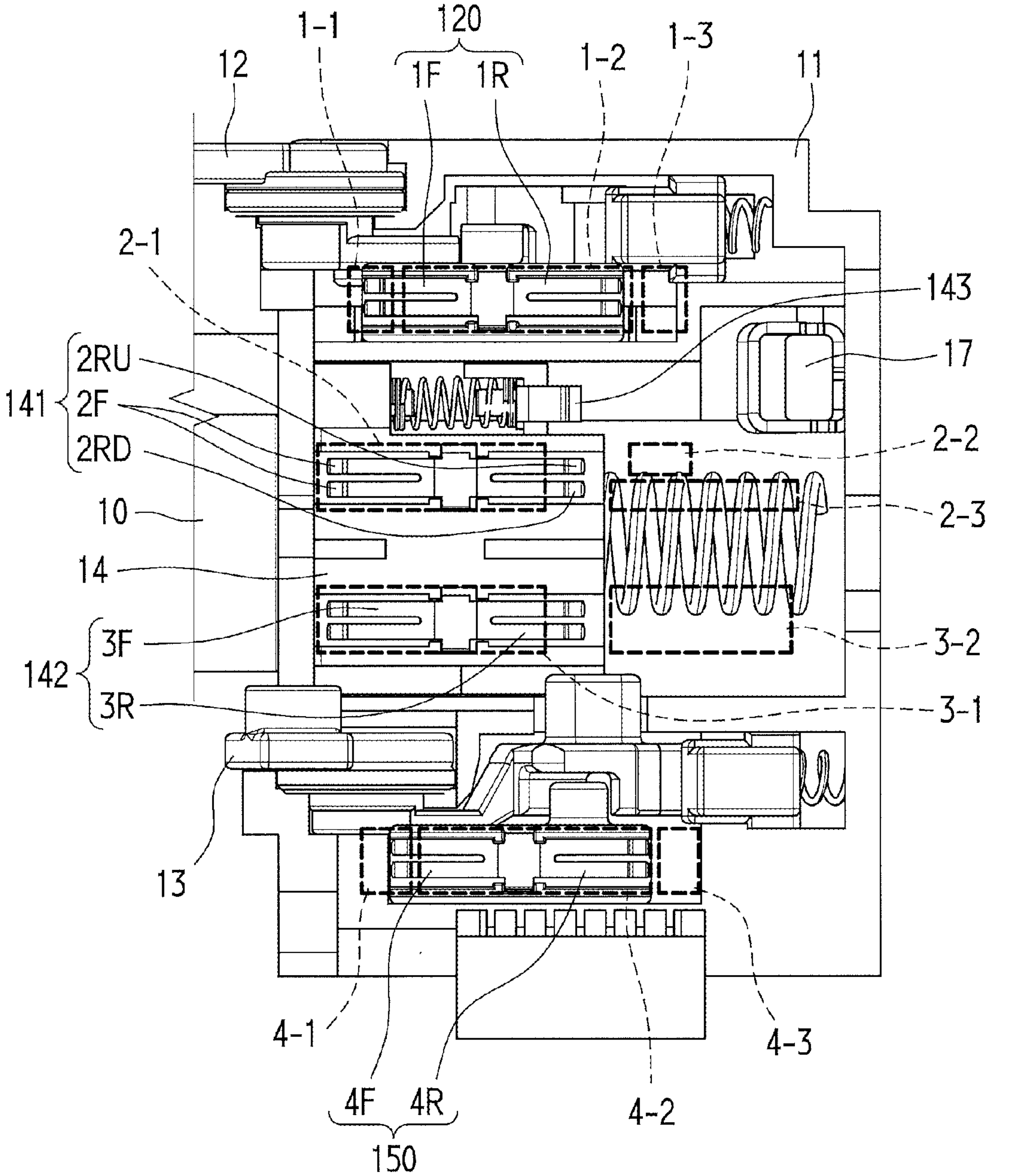
FIG. 18 is a diagram illustrating a schematic view of an example of an internal configuration of a casing included in a trigger switch described in the present application.
Figure 19:
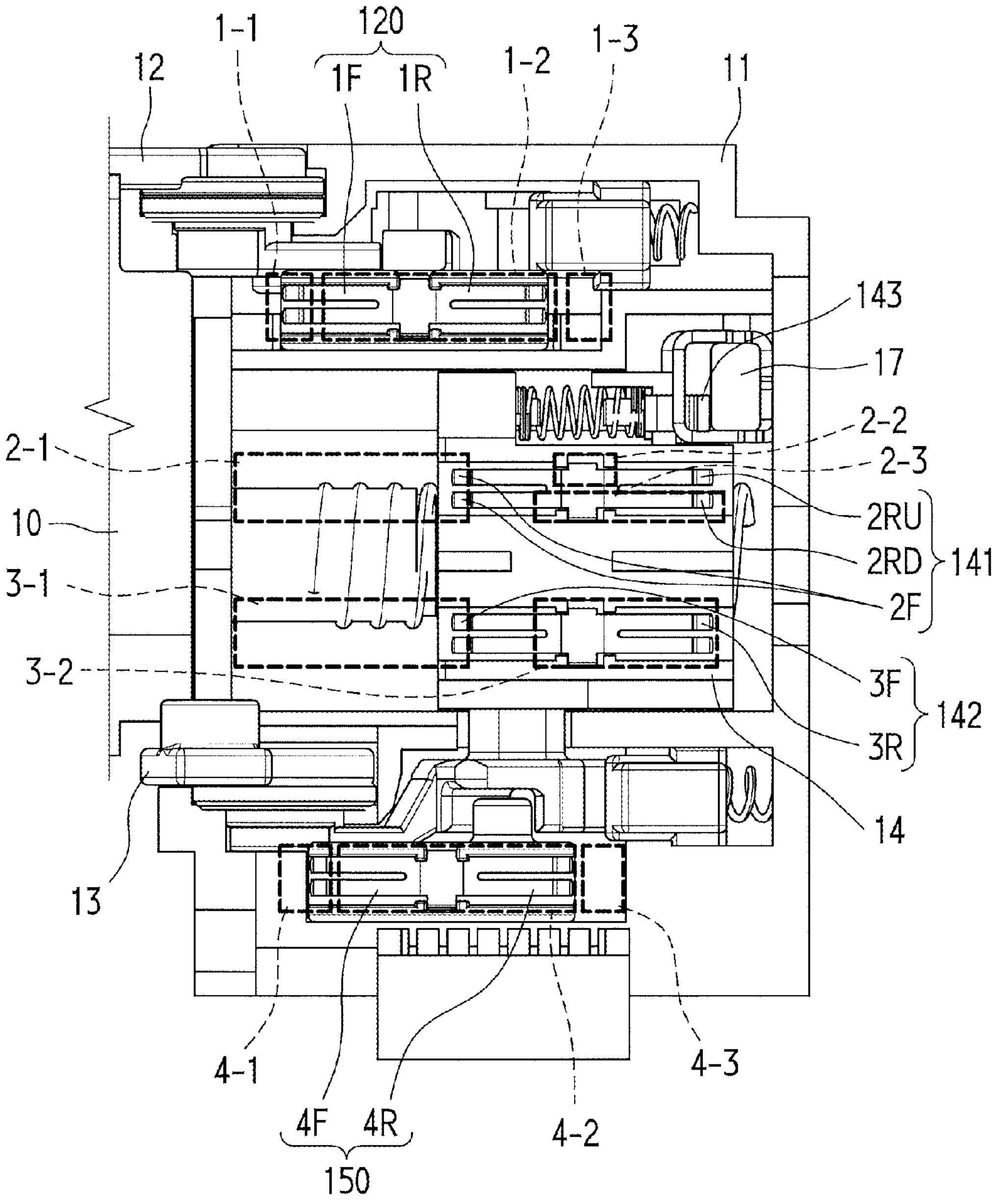
FIG. 19 is a diagram illustrating a schematic view of an example of an internal configuration of a casing included in a trigger switch described in the present application.

Next, a circuit configuration of the trigger switch 1 will be described. FIGS. 16 to 19 are schematic views showing an example of an internal configuration of the casing 11 included in the trigger switch 1 described in the present application. FIGS. 16 to 19 show inside of the casing 11 of the trigger switch 1 as viewed from the right side. Further, each electrode disposed inside the casing 11 that comes into contact with each brush and forms a part of an electric circuit is shown by a broken line. Note that FIGS. 16 and 17 show a case where the mode switching lever 13 is at the position in the constant speed mode. FIG. 16 shows a state in which the trigger 10 is released, and FIG. 17 shows a state in which the trigger 10 is pushed. FIGS. 18 and 19 show a case where the mode switching lever 13 is at the position in the shift mode. FIG. 18 shows a state in which the trigger 10 is released, and FIG. 19 shows a state in which the trigger 10 is pushed.

The electrode in contact with each brush will be described. Electrodes 1-1, 1-2, and 1-3 are disposed from the front to the rear as electrodes that come into contact with the first brush 120 that moves back and forth in conjunction with the swing of the forward/reverse switching lever 12. As shown in FIGS. 16 to 19, when the first brush 120 is located in the front, front and rear brush pieces 1F and 1R of the first brush 120 come into contact with the electrodes 1-1 and 1-2, and electrically connect between the electrodes 1-1 and 1-2 to form a circuit that rotates the drive unit forward. When the first brush 120 is located in the rear, the front and rear brush pieces 1F and 1R of the first brush 120 come into contact with the electrodes 1-2 and 1-3, and electrically connect between the electrodes 1-2 and 1-3 to form a circuit that rotates the drive unit reversely.

An electrode 2-1 is provided as a GND electrode with which two front brush pieces 2F of the second brush 141 are always in contact. The second brush 141 moves back and forth together with the plunger 14 in conjunction with the pushing of the trigger 10. An electrode 2-2 is disposed as an electrode with which an upper brush piece 2RU, of rear brush pieces of the second brush 141, comes into contact. The electrode 2-2 is an electrode of a circuit formed in the constant speed mode. As shown in FIG. 16, when the trigger 10 is released, the brush piece 2RU of the second brush 141 is in non-contact with the electrode 2-2. As shown in FIG. 17, when the trigger 10 is pushed and the plunger 14 moves backward, the brush piece 2RU of the second brush 141 comes into contact with the electrode 2-2 and electrically connects between the electrodes 2-1 and 2-2 to form a circuit that drives the drive unit at constant speed.

An electrode 2-3 is disposed as an electrode with which a lower brush piece 2RD, of the rear brush pieces of the second brush 141, comes into contact. The electrode 2-3 is an electrode of a circuit formed in the shift mode. The electrode 2-3 is formed as a printing resistor forming a long strip shape in the front-rear direction, and is an electrode using a variable resistor whose electrical resistance constituting a circuit changes depending on a contact position. As shown in FIG. 18, when the trigger 10 is released, the brush piece 2RD of the second brush 141 is in non-contact with the electrode 2-3. As shown in FIG. 19, when the trigger 10 is pushed and the plunger 14 moves backward, the brush piece 2RD of the second brush 141 comes into contact with a front end of the electrode 2-3, and electrically connects between the electrodes 2-1 and 2-2 to form a circuit that drives the drive unit. Furthermore, when the trigger 10 is pushed and the plunger 14 moves, the brush piece 2RD of the second brush 141 moves backward while maintaining the state of being in contact with the electrode 2-3. Thus, a resistance value is lowered and drive speed is raised. FIG. 19 shows a state in which the trigger 10 is pushed to the maximum pushing amount.

An electrode 3-1 is disposed as an electrode with which front brush pieces 3F of the third brush 142 are always in contact. The third brush 142 moves back and forth together with the plunger 14 in conjunction with the pushing of the trigger 10. An electrode 3-2 is disposed as an electrode with which rear brush pieces 3R of the third brush 142 come into contact. The electrodes 3-1 and 3-2 are electrodes that form a circuit that outputs a drive signal to the drive unit. As shown in FIGS. 16 and 18, when the trigger 10 is released, the brush pieces 3R of the third brush 142 are in non-contact with the electrode 3-2. As shown in FIGS. 17 and 19, when the trigger 10 is pushed and the plunger 14 moves backward, the brush pieces 3R of the third brush 142 come into contact with the electrode 3-2, and electrically connect between the electrodes 3-1 and 3-2 to form a circuit that outputs a drive signal to the drive unit.

Electrodes 4-1, 4-2, and 4-3 are disposed from the front to the rear as electrodes that come into contact with the fourth brush 150 that moves back and forth in conjunction with the swing of the mode switching lever 13. As shown in FIGS. 16 and 17, when the fourth brush 150 is located in the rear, front and rear brush pieces 4F and 4R of the fourth brush 150 come into contact with the electrodes 4-2 and 4-3, and electrically connect between the electrodes 4-2 and 4-3 to form a circuit that drives the drive unit in the constant speed mode. As shown in FIGS. 18 and 19, when the fourth brush 150 is located in the front, the front and rear brush pieces 4F and 4R of the fourth brush 150 come into contact with the electrodes 4-1 and 4-2, and electrically connect between the electrodes 4-1 and 4-2 to form a circuit that drives the drive unit in the shift mode.

Furthermore, as shown in FIG. 19, when the plunger 14 moves rearward and the full speed movable contact 143 abuts on the full speed fixed contact 16, a circuit that drives the drive unit at the maximum output (full speed mode) is formed.

Figure 20:
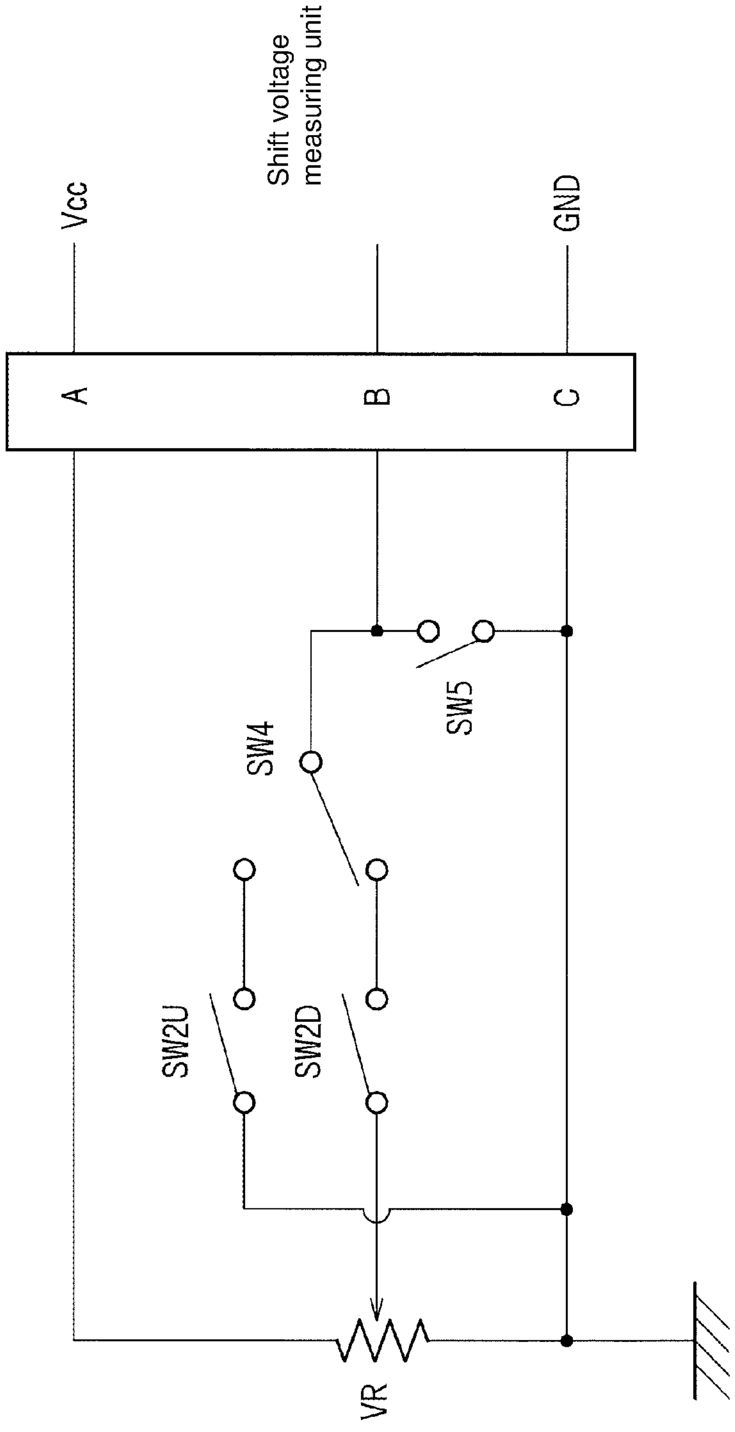
FIG. 20 is a circuit diagram illustrating showing an example of an equivalent circuit of an example of an electric circuit in a trigger switch described in the present application.

FIG. 20 is a circuit diagram showing an example of an equivalent circuit of an example of an electric circuit in the trigger switch 1 described in the present application. The trigger switch 1 incorporated in the electric device is connected to a Vcc electrode, a GND electrode, and a shift voltage measuring unit of the drive unit of the electric device via connectors A, B, and C. A switch SW4 shown in the circuit diagram corresponds to a switch realized by the fourth brush 150, and has a function of switching the drive mode of the drive unit. A switch SW2U shown in the circuit diagram corresponds to a switch realized by the brush piece 2RU of the second brush 141, and has a function of switching on/off in the constant speed mode. A switch SW2D shown in the circuit diagram corresponds to a switch realized by the brush piece 2RD of the second brush 141. The switch SW2D has functions of switching on/off in the shift mode and shifting a voltage signal output to the drive unit by connecting to a variable resistor VR formed as the electrode 2-3. A switch 5 shown in the circuit diagram corresponds to a switch realized by the full speed movable contact 143 and the full speed fixed contact 16. The switch 5 has functions of switching on/off in the full speed mode at the maximum output and outputting a signal for driving the drive unit at the maximum output when the full speed mode is turned on.

The trigger switch 1 described in the present application configured as described above is incorporated in the electric device, and can switch between the constant speed mode and the shift mode by switching the mode switching lever 13. Further, since the position of the mode switching lever 13 can be clearly visually recognized from the appearance, a user can easily recognize the drive mode visually. Further, by engaging the mode switching lever 13 with the engaging member 17, the user recognizes the click feeling by touch and can recognize that the drive mode has been switched. Also, the mode switching lever 13 is attached to the casing 11 at the position different from that of the trigger 10, and the circuit can be configured in the casing 11, so that a water-resistant property can be improved. As described above, the trigger switch 1 described in the present application has various effects.

The present invention is not limited to the embodiments described above, and can be implemented in various other modes. Therefore, the embodiments described above are merely examples in all respects, and should not be limitedly interpreted. The technical scope of the present invention is described by the scope of the claims and is not bound by the text of the specification. Furthermore, all modifications and changes belonging to the equivalent scope of the claims are within the scope of the present invention.

For example, in the above-described embodiments, the drive mode is switched in two stages of the constant speed mode and the shift mode. However, the present invention is not limited to this, and the drive mode can be designed to be switched in three or more stages. When the drive mode is designed in three or more stages, drive speed in the constant speed mode may be designed in two or more stages, and a change rate with respect to the maximum drive speed or the pushing amount in the shift mode may be designed in two or more stages. Then, when the drive mode is switched to three or more stages, it is possible to correspond by modifying a shape of the mode switching lever 13.

Figure 21A:
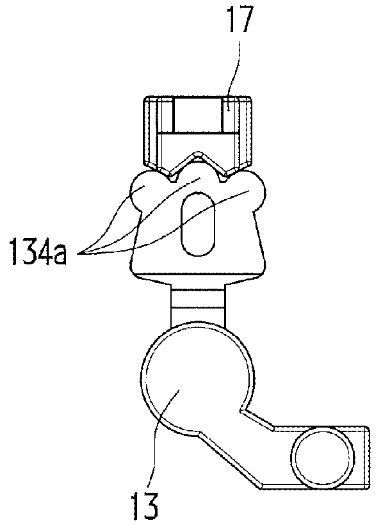
FIG. 21A is a diagram illustrating a schematic external view of an example of a mode switching lever and an engaging member included in a trigger switch described in the present application.
Figure 21B:
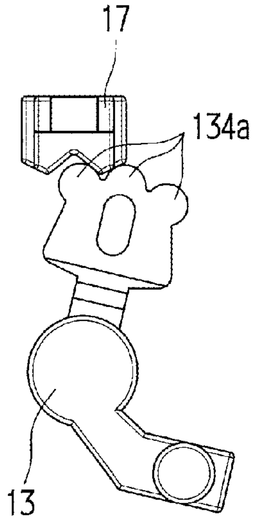
FIG. 21B is a diagram illustrating a schematic external view of an example of a mode switching lever and an engaging member included in a trigger switch described in the present application.
Figure 21C:
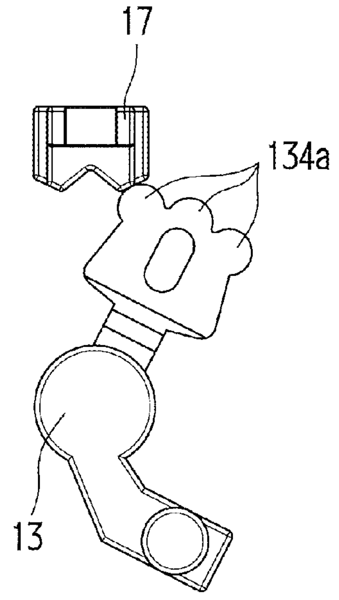
FIG. 21C is a diagram illustrating a schematic external view of an example of a mode switching lever and an engaging member included in a trigger switch described in the present application.

FIGS. 21A, 21B, and 21C are schematic external views showing an example of a mode switching lever 13 and the engaging member 17 included in the trigger switch 1 described in the present application. In the mode switching lever 13 illustrated in FIGS. 21A, 21B, and 21C, three engaging portions 134*a* are formed as projections. As shown in FIGS. 21A, 21B, and 21C, the mode switching lever 13 can set three switching positions. Therefore, it is possible to realize the trigger switch 1 with three-stage drive modes by forming a circuit according to the position.

Further, for example, in the above-described embodiments, the pushing amount of the trigger 10 is regulated by the cooperation between the plunger 14 and the mode switching lever 13. However, the present invention is not limited to this, and it is possible to regulate the pushing amount of the trigger 10 in various modes.

Figure 22:
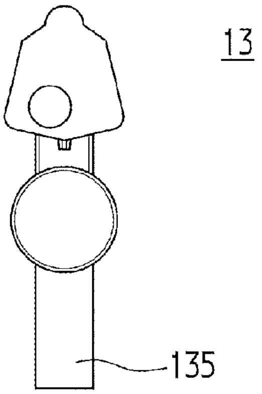
FIG. 22 is a diagram illustrating a schematic external view of an example of a mode switching lever included in a trigger switch described in the present application.
Figure 23:
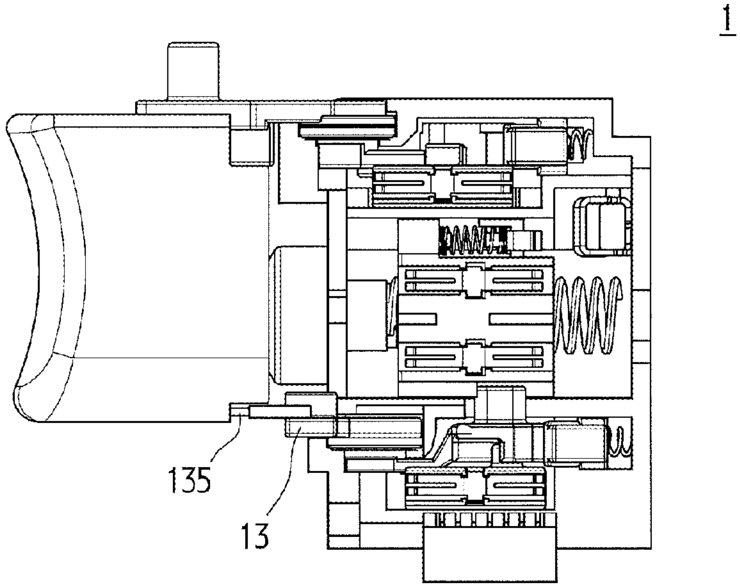
FIG. 23 is a diagram illustrating a schematic external view of an example of a trigger switch described in the present application.

FIG. 22 is a schematic external view showing an example of a mode switching lever 13 included in the trigger switch 1 described in the present application, and FIG. 23 is a schematic external view showing an example of the trigger switch 1 described in the present application. The mode switching lever 13 illustrated in FIG. 22 is formed with a regulating piece 135 extending forward (downward when facing the drawing). Then, as illustrated in FIG. 23, the regulating piece 135 abuts on the rear surface of the trigger switch 1 to regulate a pushing amount of the trigger switch 1. As illustrated in FIGS. 22 and 23, the regulation of the pushing amount can be realized in various ways.

In addition to the above-mentioned modes, it can be developed into various modes. For example, it suffices if the mode switching lever 13 and the engaging member 17 included in the trigger switch 1 described in the present application are engaged and positioned, and can be developed into various modes. For example, a recess is formed in the mode switching lever 13, a protrusion is formed in the engaging member 17, and the mode switching lever 13 and the engaging member 17 are formed to engage with each other.

Further, it can be developed into various modes. For example, in the trigger switch 1 described in the present application, instead of using the lever as the switching member for switching the drive mode, a member having various shapes such as a dial type is used as the switching member.

DESCRIPTION OF SYMBOLS

1 trigger switch
10 trigger
11 casing
12 forward/reverse switching lever
120 first brush
13 mode switching lever (switching member)
130 lever
131 swing shaft
132 sealing member
134 working portion
134*a* engaging portion
134*b* regulating portion
134*c* cam groove
14 plunger
141 second brush
142 third brush
143 full speed movable contact
144 through groove
146 receiving portion
15 brush stand
150 fourth brush
151 projection
16 full speed fixed contact
17 engaging member
170 recess

The invention claimed is:

1. A trigger switch configured to drive a drive unit by pushing a trigger, comprising a switching member configured to switch between a mode in which the drive unit is driven at constant speed and a mode in which the drive unit is driven by an output according to a pushing amount of the trigger, wherein the switching member is configured to receive a swing operation to switch between the modes, and includes a regulating portion coupled to the trigger and configured to regulate the pushing amount of the trigger according to the switched mode and thereby regulate whether the pushing amount results the drive unit being driven at the constant speed or the drive unit being driven by an output according to a pushing amount of the trigger.

2. The trigger switch according to claim 1, further comprising an engaging member configured to engage with the switching member, wherein
the switching member
is configured to swing,
is formed to determine the mode based on a swing position thereof, and
includes an engaging portion configured to engage with the engaging member according to the swing position that determines the mode, and
one of the engaging member and the engaging portion of the switching member is a projection, and another thereof is a recess.

3. The trigger switch according to claim 1, wherein the switching member includes a lever configured to receive the swing operation.

4. The trigger switch according to claim 1, further comprising a casing to which the trigger is attached, wherein
the switching member is attached to the casing at a position different from a position of the trigger, and
a sealing member is attached to an attachment portion of the switching member in the casing.

5. The trigger switch according to claim 2, wherein the switching member includes a lever configured to receive the swing operation.

6. The trigger switch according to claim 2, further comprising a casing to which the trigger is attached, wherein
the switching member is attached to the casing at a position different from a position of the trigger, and
a sealing member is attached to an attachment portion of the switching member in the casing.

7. The trigger switch according to claim 3, further comprising a casing to which the trigger is attached, wherein
the switching member is attached to the casing at a position different from a position of the trigger, and
a sealing member is attached to an attachment portion of the switching member in the casing.

8. The trigger switch according to claim 5, further comprising a casing to which the trigger is attached, wherein
the switching member is attached to the casing at a position different from a position of the trigger, and
a sealing member is attached to an attachment portion of the switching member in the casing.

* * * * *